No. 745,162. PATENTED NOV. 24, 1903.
E. P. DONNELLY.
COMBINED CLEAVER AND KNIFE.
APPLICATION FILED APR. 4, 1903.
NO MODEL.
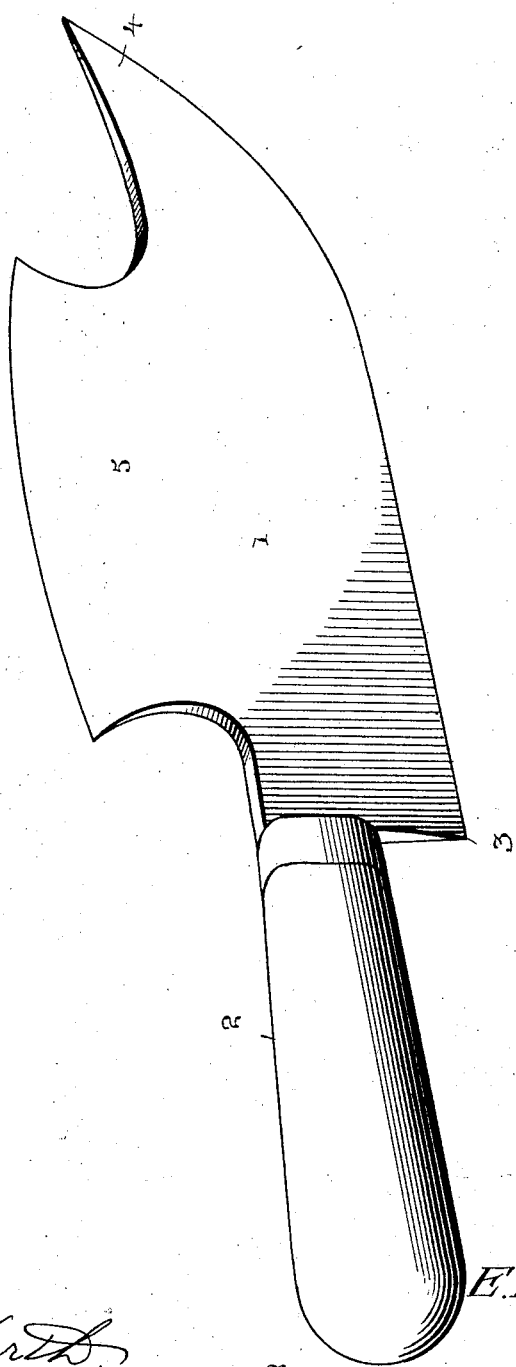
Witnesses
Wm. J. Koerth.
Chas. S. Hyer.
Inventor
E. P. Donnelly,
By Victor J. Evans
Attorney No. 745,162. Patented November 24, 1903.

UNITED STATES PATENT OFFICE.

EDWARD P. DONNELLY, OF MANCHESTER, NEW HAMPSHIRE.

COMBINED CLEAVER AND KNIFE.

SPECIFICATION forming part of Letters Patent No. 745,162, dated November 24, 1903.

Application filed April 4, 1903. Serial No. 151,170. (No model.)

*To all whom it may concern:*

Be it known that I, EDWARD P. DONNELLY, a citizen of the United States, residing at Manchester, in the county of Hillsboro and State of New Hampshire, have invented new and useful Improvements in a Combined Cleaver and Knife, of which the following is a specification.

This invention relates to a knife and cleaver combined in one blade and adapted for cutting meat and chopping bone, the two latter operations being readily pursued by merely reversing the knife; and the primary object of the same is to reduce the number of cutting devices ordinarily employed in slicing or preparing meats and removing bone, the improved device being particularly useful in households.

The invention consists in the construction and arrangement of the several parts, which will be more fully hereinafter described and claimed.

The drawing shows a perspective view of a knife embodying the features of the invention.

The numeral 1 designates a blade having a handle 2. The lower edge 3 of the blade is sharpened and flares upwardly to a point 4, the cutting edge extending full length of the blade from the heel to the point. From an intermediate part of the blade a cleaver 5 projects and has the usual cleaver cutting edge. The opposite faces or sides of the cleaver continue smoothly into the opposite faces of the main body of the blade, so that neither the cutting edge 3 nor the cleaver will be obstructed in its use.

By locating the cleaver-blade at an intermediate point in relation to the main blade a more forceful cutting blow can be imparted thereby when grasping the handle 2. It will be seen that the edge 3 of the blade can be used on meat without bone obstruction, and when it is desired to cut the latter the entire knife may be quickly turned to bring the cleaver-blade into operative position.

It will be understood that changes in the proportions and dimensions of the several parts may be resorted to without departing from the spirit of the invention.

Having thus fully described the invention, what is claimed as new is—

A double cutting-blade having at one end a handle thereon and a convex cutting edge extending the full length thereof and continuing into a point at the free end of the blade, the back of the blade having an integral cleaver member projecting therefrom at a distance from said point, the opposite sides of the blade being smooth and regularly merging into the cleaver member, the blade being reversible to use the cutting edge or the cleaver member.

In testimony whereof I affix my signature in presence of two witnesses.

EDWARD P. DONNELLY.

Witnesses:
M. S. BENNETT,
JOHN O'NEILL.